(12) United States Patent
Mukai et al.

(10) Patent No.: US 11,519,799 B2
(45) Date of Patent: Dec. 6, 2022

(54) FORCE SENSOR

(71) Applicant: SINTOKOGIO, LTD., Nagoya (JP)

(72) Inventors: Suguru Mukai, Nagano (JP); Natsuki Yui, Nagano (JP); Hiroyasu Makino, Aichi (JP); Takumi Kobayashi, Aichi (JP)

(73) Assignee: SINTOKOGIO, LTD., Aichi (JP)

( * ) Notice: Subject to any disclaimer, the term of this patent is extended or adjusted under 35 U.S.C. 154(b) by 229 days.

(21) Appl. No.: 16/826,792

(22) Filed: Mar. 23, 2020

(65) Prior Publication Data

US 2020/0309626 A1  Oct. 1, 2020

(30) Foreign Application Priority Data

Mar. 29, 2019 (JP) .............................. JP2019-068597

(51) Int. Cl.
*G01L 5/1627* (2020.01)
*G01L 5/10* (2020.01)
*G01B 7/16* (2006.01)

(52) U.S. Cl.
CPC .............. *G01L 5/1627* (2020.01); *G01B 7/18* (2013.01); *G01L 5/10* (2013.01)

(58) Field of Classification Search
CPC . G01L 5/1627; G01L 5/10; G01L 1/22; G01L 1/2281; G01L 1/2262; G01L 5/162; G01L 1/18; G01P 1/023; G01P 15/125; G01B 7/18
USPC .................................................. 73/862.267
See application file for complete search history.

(56) References Cited

U.S. PATENT DOCUMENTS

| | | | |
|---|---|---|---|
| 7,437,954 B2 * | 10/2008 | Sakano | G01L 5/162 73/862.043 |
| 7,536,922 B2 * | 5/2009 | Sakurai | G01L 1/205 73/862.041 |
| 2006/0037409 A1 * | 2/2006 | Ichige | G01L 5/1627 73/862 |
| 2006/0174718 A1 | 8/2006 | Morimoto | |
| 2016/0114484 A1 * | 4/2016 | Nakayama | G05B 19/4062 700/258 |

FOREIGN PATENT DOCUMENTS

| | | |
|---|---|---|
| JP | S58177278 U | 11/1983 |
| JP | 2005-31062 A | 2/2005 |
| JP | 2016070673 A | 5/2016 |
| JP | 2018146309 A | 9/2018 |

(Continued)

OTHER PUBLICATIONS

Office Action for Japanese Patent Application No. 2019-068597 dated Jul. 5, 2022 and partial English translation thereof.

*Primary Examiner* — Octavia Davis Hollington
(74) *Attorney, Agent, or Firm* — Harness, Dickey & Pierce, P.L.C.

(57) ABSTRACT

The present invention provides a force sensor that is capable of detecting plastic deformation of a strain element. The force sensor detects components, in a plurality of directions, of a force exerted on the strain element. The force sensor includes: inspection strain gauges disposed in stress concentration areas of the strain element; and an inspection bridge circuit that includes the inspection strain gauges and that is configured to detect a component, in a specific direction, of a stress that occurs in the strain element.

5 Claims, 12 Drawing Sheets

(56) References Cited

FOREIGN PATENT DOCUMENTS

| | | | | |
|---|---|---|---|---|
| JP | 6618128 | B2 | * | 12/2019 |
| KR | 101481784 | B1 | * | 1/2015 |
| KR | 102183179 | B1 | * | 11/2020 |

* cited by examiner

FORCE SENSOR

This Nonprovisional application claims priority under 35 U.S.C. § 119 on Patent Application No. 2019-068597 filed in Japan on Mar. 29, 2019, the entire contents of which are hereby incorporated by reference.

TECHNICAL FIELD

The present invention relates to a force sensor.

BACKGROUND ART

Force-torque sensors are used in various industrial fields. One example of such force-torque sensors is a strain gauge force-torque sensor, which is for detecting specific directional components of a force exerted on a strain element with use of bridge circuits each including a certain combination of strain gauges. The strain gauges detect strain in the strain element caused by the force applied to the strain element. The strain element includes, for example: a core portion that receives a force; a frame portion fixed to the core portion; arm portions that connect the core portion and the frame portion; and flexures residing between the frame portion and the arm portions. The strain gauges are disposed, for example, at appropriate positions on the arm portions and the flexures. The bridge circuits detect, for example, the following components along six directions in total, respectively: components of a force in directions along X, Y, and Z axes; and moment components about the X, Y, and Z axes (see, for example, Patent Literatures 1 and 2).

CITATION LIST

Patent Literature

[Patent Literature 1]
Japanese Patent Application Publication Tokukai No. 2016-070673
[Patent Literature 2]
Japanese Patent Application Publication Tokukai No. 2018-146309

SUMMARY OF INVENTION

Technical Problem

The strain element may plastically deform and, may even fracture, when subjected to a force above its elastic limit. If the strain element plastically deforms, the force-torque sensor may become incapable of detecting forces normally. Therefore, detecting plastic deformation of the strain element is advantageous in order to improve the reliability of the force-torque sensor. The conventional force-torque sensors, however, do not have any effective means to detect plastic deformation of the strain element.

An object of an aspect of the present invention is to achieve a force sensor that is capable of detecting plastic deformation of a strain element.

Solution to Problem

In order to attain the above object, a force sensor in accordance with Aspect 1 of the present invention is a force sensor for detecting components, in a plurality of directions, of a force exerted on a strain element, the force sensor including an inspection circuit that includes inspection strain sensing elements disposed in stress concentration areas of the strain element and that is configured to detect a component, in a specific direction, of a stress that occurs in the strain element.

Advantageous Effects of Invention

According to an aspect of the present invention, it is possible to achieve a force sensor that is capable of detecting plastic deformation of a strain element.

DESCRIPTION OF EMBODIMENTS

Embodiment 1

The following description will discuss an embodiment of the present invention in detail. With regard to numbers concerning constituent elements (such as the number of constituent elements, numerical values concerning constituent elements, quantities concerning constituent elements, ranges concerning constituent elements, and the like), the numbers are not limited to those specified herein and may be equal to or greater than or may be equal to or less than those specified herein, unless otherwise specified or unless it is apparent that the numbers are limited to those specified herein in principle.

A force-torque sensor (an example of force sensor of the present invention) in accordance with Embodiment 1 is a force-torque sensor to detect components, in a plurality of directions, of a force exerted on a strain element. In Embodiment 1, strain sensing elements for inspection (hereinafter also referred to as "inspection strain sensing elements") detect stresses induced by bending, shearing, compression, and/or tension. The inspection strain sensing elements may detect any one of these kinds of stress or two or more of these kinds of stress. In Embodiment 1, the "plurality of directions" of the components of a force detected by the force-torque sensor are the following six directions: directions parallel to respective three orthogonal axes; and directions of rotation about the respective three axes. The directions parallel to the respective three orthogonal axes are represented by a three-dimensional orthogonal coordinate system (x axis, y axis, z axis). Hereinafter, the six directions are also referred to as "six-axis directions." The components of a force along these three directions may be referred to as Fx, Fy, and Fz. The moment components about these three axes may be referred to as Mx, My, and Mz. A force-torque sensor that detects forces in these six directions is called a six-axis force-torque sensor.

Figure 1:
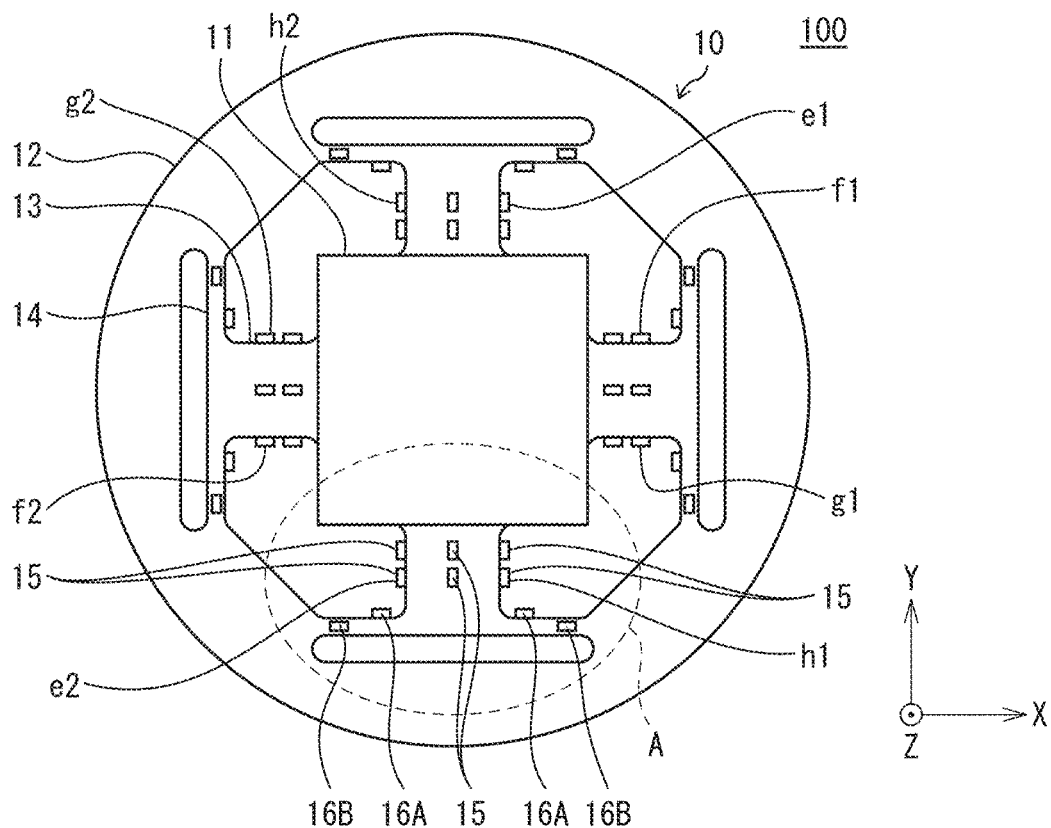
FIG. 1 is a plan view schematically illustrating a structure of a strain element included in a force-torque sensor in accordance with Embodiment 1 of the present invention.
Figure 2:
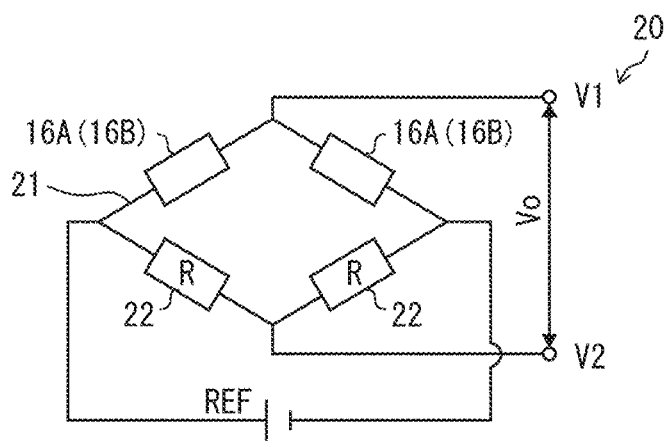
FIG. 2 illustrates an example of an inspection bridge circuit that includes inspection strain gauges of the force-torque sensor.
Figure 3:
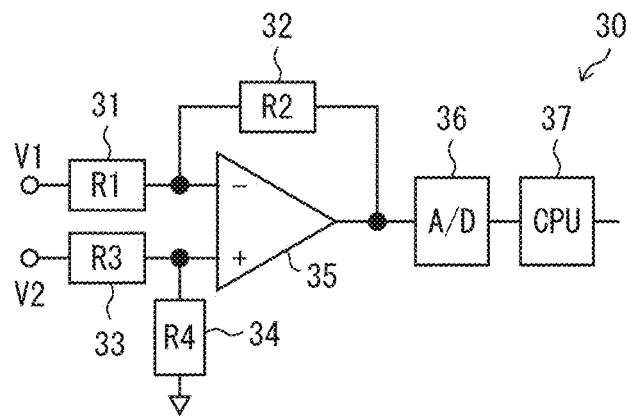
FIG. 3 illustrates an example of a failure detection circuit for connection with the inspection bridge circuit.
Figure 4:
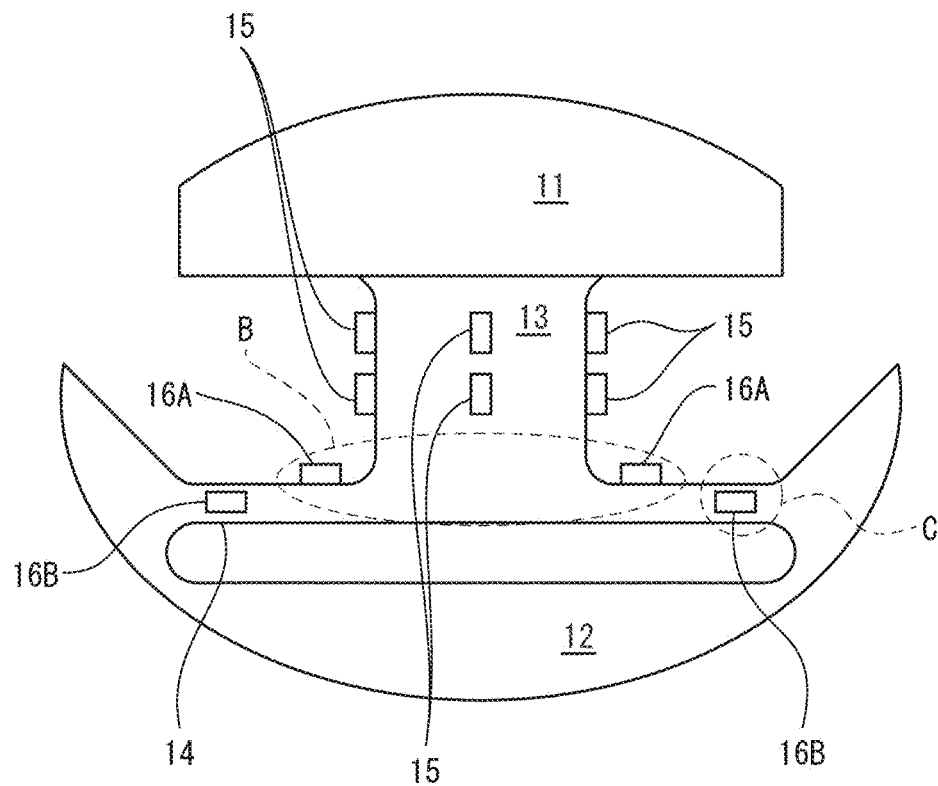
FIG. 4 is an enlarged view of area A of FIG. 1.
Figure 5:
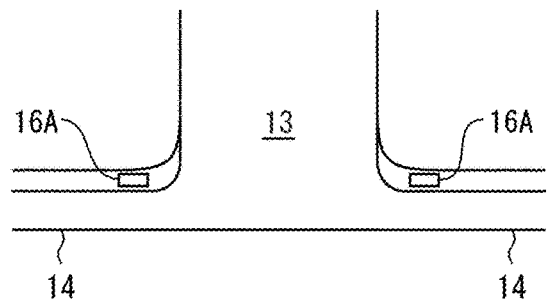
FIG. 5 is an enlarged view of area B of FIG. 4.
Figure 6:
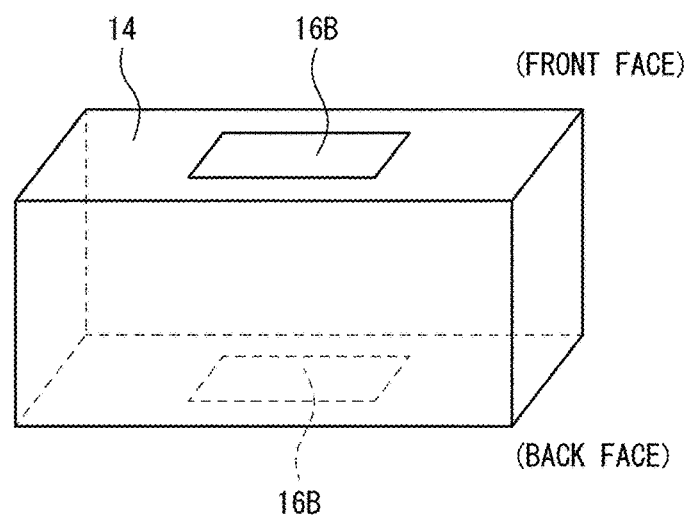
FIG. 6 is an enlarged view of area C of FIG. 4.

FIG. 1 is a plan view schematically illustrating a structure of the strain element included in the force-torque sensor in accordance with Embodiment 1 of the present invention. FIG. 2 illustrates an example of a bridge circuit for inspection (hereinafter also referred to as "inspection bridge circuit") that includes strain gauges for inspection (hereinafter also referred to as "inspection strain gauges") of the force-torque sensor. FIG. 3 illustrates an example of a failure detection circuit for connection with the inspection bridge circuit. FIG. 4 is an enlarged view of area A of FIG. 1. FIG. 5 is an enlarged view of area B of FIG. 4. FIG. 6 is an enlarged view of area C of FIG. 4.

A force-torque sensor 100 in accordance with Embodiment 1 is configured to detect components, in six-axis directions, of a force exerted on a strain element 10. The force-torque sensor 100 includes: a plurality of inspection strain gauges 16A and a plurality of inspection strain gauges 16B which are disposed in stress concentration areas of the strain element 10; and inspection bridge circuits 20 that detect specific directional components of a stress that occurs in the strain element 10. The following description discusses a configuration of the strain element 10 and a feature to detect components of a stress in the six-axis directions.

[Strain Element]

The strain element 10 has: a main face (also referred to as front face or first face); an opposite face from the main face (also referred to as back face or second face); and an outer peripheral face.

The strain element 10 includes: a core portion 11 that receives a force; a frame portion 12 that is fixed to the core portion 11; and beam portions that connect the core portion 11 and the frame portion 12. Each of the beam portions includes: an arm portion 13 that is connected to the core portion 11; and a flexure 14 that resides between the frame portion 12 and the arm portion 13.

The strain element 10 is configured such that, when the core portion 11 and the frame portion 12 are considered rigid bodies, the beam portions (arm portions 13 and flexures 14) can be considered elastic bodies. The core portion 11 is a central portion of the strain element 10 when seen in plan view. The frame portion 12 is, when the strain element 10 is seen in plan view, a rim portion that extends around and is spaced from the core portion 11 located at the center.

The core portion 11 in Embodiment 1 serves to receive a force to be detected, and is also referred to as a force receiver. The frame portion 12 in Embodiment 1 serves to fix the position of the core portion 11 relative to an object to which the force-torque sensor 100 is attached, and is also referred to as a fixing portion. The core portion 11 and the frame portion 12 can each serve as a force receiver or a fixing portion.

There is no limitation on the shape of the core portion 11. In Embodiment 1, the core portion 11 is in the shape of a prism with a substantially square base (i.e., substantially in the shape of a quadratic prism). There is no limitation on the shape of the frame portion 12, as well. In Embodiment 1, the frame portion 12 is in the shape of a tube with a substantially circular base having a substantially square opening.

The beam portions each extend radially from the core portion 11. There is no limitation on the number of beam portions. In Embodiment 1, the number of beam portions is four. The beam portions are arranged, for example, in the form of a cross in plan view.

Each arm portion 13 is a wide portion of the beam portion and is connected to the core portion 11. The arm portion 13 extends to a position short of the frame portion 12, and therefore there is a gap between the frame-portion-12-side end of the arm portion 13 and the frame portion 12.

Each flexure 14 extends from the frame-portion-12-side end of the arm portion 13 to the frame portion 12 along a direction intersecting (in Embodiment 1, orthogonal to) the direction of extension of the arm portion 13, and is connected to the frame portion 12. The flexure 14 is narrower than the arm portion 13.

The strain element 10 can be obtained by, for example, making through-holes or the like in a material with a spring property such as an aluminum alloy, alloy steel, or stainless steel with use of a numerical controlled (NC) machine. The through-holes define spaces by which the core portion 11, the frame portion 12, the arm portions 13, and the flexures 14 are partitioned. The inner walls of the through-holes are each orthogonal to the first face and the opposite second face of the strain element 10.

Each border portion between the core portion 11 and an arm portion 13, each border portion between an arm portion 13 and a flexure 14, and each border portion between a flexure 14 and the frame portion 12 have fillet faces, for the purpose of adjustment of the properties of the force-torque sensor 100. Such border portions may have chamfered faces. The shape of each of such border portions may be any shape, provided that the above properties can be adjusted.

Note that each border portion between the core portion 11 and an arm portion 13, and each border portion between the frame portion 12 and a flexure 14, may also undergo strain. In Embodiment 1, the former border portion is considered a part of the arm portion 13, and the latter border portion is considered a part of the flexure 14.

[Strain Gauge]

The strain element 10 has thereon a plurality of strain sensing elements for detection of deformation of the strain element. There is no limitation on the strain sensing elements, provided that the strain sensing elements are capable of detecting deformation of the strain element. Examples of the strain sensing elements include thin metal film strain gauges and semiconductor strain gauges. In Embodiment 1, the strain sensing elements are thin metal film strain gauges.

The strain gauges include: strain gauges for measurement (hereinafter also referred to as "measurement strain gauges") 15 each of which is for use in detecting any of the components, in the six-axis directions, of a force exerted on the strain element 10; and a plurality of inspection strain gauges, i.e., the inspection strain gauges 16A and the inspection strain gauges 16B, which are disposed in stress concentration areas. Each of the strain gauges is an element that changes resistance upon deformation of the strain element 10 caused by strain. In Embodiment 1, all the strain gauges are of the same kind; however, the strain gauges may be of different kinds, provided that the strains can be detected.

Known strain gauges can be used as the strain gauges. Examples of the known strain gauges include: strain gauges including (i) a conductive pattern made of a thin metal film and (ii) a flexible resin film that covers the pattern; and strain gauges comprised of a thin semiconductor film. Examples of a metal for the thin metal film include: copper (Cu)-nickel (Ni)-based alloys; and Ni-chromium (Cr)-based alloys. Examples of the resin include polyimide and epoxy resins. There is no limitation on how to place and fix the strain gauges. Each of the strain gauges may be bonded to an arm portion 13 or a flexure 14 with an adhesive. Alternatively, a sputtering method or a vacuum evaporation method may be used to prepare traces of the thin metal film or of the thin semiconductor film directly onto an arm portion 13 or a flexure 14 and thereby place a strain gauge at a desired position.

The following description discusses an arrangement of the measurement strain gauges 15 for detection of components of a force in six-axis directions.

[Arrangement of Measurement Strain Gauges]

The measurement strain gauges 15 are disposed on four faces (first face, second face, and opposite side faces) of each arm portion 13. At each of the four faces of the arm portion 13, two measurement strain gauges 15 are positioned next to each other along the direction of extension of the arm portion 13 (direction along X axis or Y axis) so as to reside in the middle of the arm portion 13 in that direction. In this manner, the measurement strain gauges 15 are disposed such that two measurement strain gauges 15 on one face of an arm portion 13 and another two measurement strain gauges 15 on the opposite face of the arm portion 13 are positioned opposite each other with the arm portion 13 between them. Note that, in FIG. 1, some of the measurement strain gauges 15 are assigned the additional symbol "e 1" and the like, in order to indicate measurement strain gauges 15 at specific positions. In the following description, for example, one, which is assigned the additional symbol "e 1", of the measurement strain gauges 15 may also be referred to as a measurement strain gauge 15e 1.

[Measurement Bridge Circuit Including Measurement Strain Gauges]

The force-torque sensor 100 includes bridge circuits for measuring components of a force in six-axis directions (such bridge circuits are not illustrated, and are hereinafter referred to as "measurement bridge circuits"). Each of the measurement bridge circuits includes appropriately arranged measurement strain gauges 15 which correspond to a direction, with regard to which the measurement is to be carried out, of the six-axis directions.

Such a measurement bridge circuit can be configured as described in Patent Literatures 1 and 2, for example. For example, a measurement bridge circuit for detection of a component Mz about the Z axis has a configuration in which a first series circuit and a second series circuit are connected in parallel with each other. The first series circuit is a circuit in which the measurement strain gauges 15e1, 15e2, 15h1 and 15h2 in FIG. 1 are connected in series in this order. The second series circuit is a circuit in which the measurement strain gauges 15f1, 15f2, 15g1 and 15g2 are connected in series in this order.

Output signals from the measurement bridge circuits are processed, for example, as described in Patent Literature 2. Output signals from the measurement bridge circuits are amplified by an amplifier, and then converted from analog signals into digital signals by an A-D converter, and the digital signals are transmitted to a central processing unit (CPU). The CPU finds six components (Fx, Fy, Fz, Mx, My, and Mz) of a force exerted on the core portion while referring to a calibration matrix. The CPU is, for example, directly connected to external equipment via a wired link, and is also connected to a D-A converter. The CPU is thus capable of outputting the results of processing in the form of a digital signal, and is also capable of outputting the results of processing in the form of an analog signal via the D-A converter.

When an external force is exerted on the core portion 11, either or both of the arm portions 13 and the flexures 14 undergo strain such as bending, shearing, and/or twisting. The force-torque sensor 100 has the foregoing feature to detect a force, and therefore is capable of highly accurately measuring components of a force in six-axis directions exerted on the core portion 11. In particular, the force-torque sensor 100 includes the flexures 14; therefore, the force-torque sensor 100 is capable of measuring components of a force in six-axis directions with higher accuracy than force-torque sensors with no flexures 14.

As described earlier, the force-torque sensor 100 includes the inspection strain gauges 16A, the inspection strain gauges 16B, and the inspection bridge circuits 20. The following discusses an arrangement of the inspection strain gauges.

[Arrangement of Inspection Strain Gauges]

A pair of inspection strain gauges 16A is disposed on a side face, which faces toward the core portion 11, of a flexure 14 so as to reside at a portion of the flexure 14 where the flexure 14 connects to an arm portion 13. Such inspection strain gauges 16A are arranged so as to be symmetrical to each other with respect to the axis of the arm portion 13.

A pair of inspection strain gauges 16B is disposed on first and second faces of the flexure 14 so as to reside at a portion of the flexure 14 where the flexure 14 connects to the frame portion 12. Such inspection strain gauges 16B are positioned opposite each other with the flexure 14 therebetween.

[Stress Concentration Area]

Each of the inspection strain gauges 16A and the inspection strain gauges 16B is disposed in one of stress concentration areas of the strain element 10. The term "stress concentration area" refers to an area where stress concentrates when an external force is applied to the core portion 11 or to the frame portion 12. In a case where a unidirectional external force results in a plurality of stress concentration areas, each inspection strain gauge may be disposed in any of the plurality of stress concentration areas. In order to detect plastic deformation of the strain element 10 with higher certainty, each stress concentration area, where an inspection strain gauge is disposed, is preferably constituted by (i) an area where the stress that occurs in the strain element 10 when an external force parallel to any of a plurality of directions is applied to the core portion 11 of the strain element 10 is maximum and (ii) the vicinity of that area. Where stress concentration areas appear is determined by the direction of an external force applied to the strain element 10.

Note that each stress concentration area appears on at least one of the first face, second face, and opposite side faces of the strain element 10. A stress concentration area resulting from a certain stress may extend over an area bridging two or more of the above faces. In such cases, an inspection strain gauge may be disposed on any of the two or more such faces. Note that the above opposite side faces are each a face that connects the first face and the second face, and are located opposite from each other. Opposite side faces of the strain element are, for example, opposite side faces of an arm portion or opposite side faces of a flexure.

The term "vicinity" with regard to a stress concentration area is the area around an area where the foregoing stress is maximum. The "vicinity" can be represented by a set of points each of which undergoes a stress that produces an effect substantially equivalent to the foregoing maximum stress on plastic deformation of the strain element 10. Each stress concentration area can be constituted by, for example, (i) an area where the maximum stress occurs and (ii) an area where a stress equal to or greater than a predetermined percentage (e.g., 90% or more) of the maximum stress occurs.

Stress concentration areas can be appropriately determined based on the shapes of either or both of the arm portions 13 and the flexures 14. For example, when the width of an arm portion 13 is increased and/or the width of a flexure 14 is reduced, stress concentration areas tend to move within the flexure 14 toward the frame portion 12, for example, tend to move to a portion of the flexure 14 where the flexure 14 connects to the frame portion 12. Note, however, that this may not apply in all cases.

Each stress concentration area can be found by a computer simulation in which an external force having a specific direction and an appropriate magnitude is exerted on the core portion 11. Alternatively, each stress concentration area may be determined based on measured values.

[Examples of Simulation Results]

Figure 7:
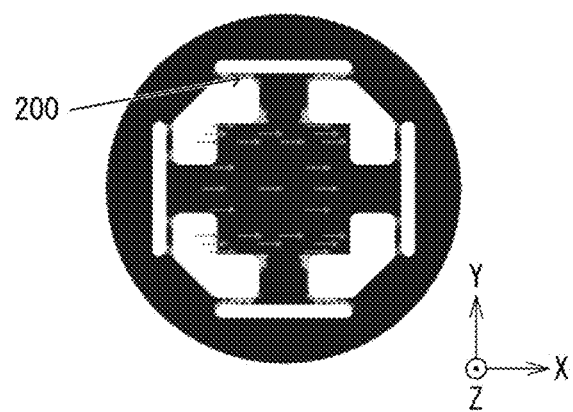
FIG. 7 is a plan view showing the result of a simulation of a stress distribution in a strain element resulting when an X-direction external force is applied to a core portion in accordance with Embodiment 1.
Figure 8:
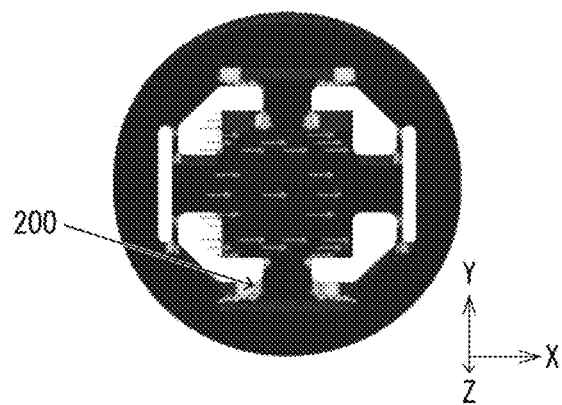
FIG. 8 shows the result of the simulation when the strain element in FIG. 7 is seen from a direction diagonal to the Y axis in the Y-Z plane.

FIG. 7 is a plan view showing the result of a simulation of a stress distribution in the strain element 10 resulting when an X-direction external force is applied to the core portion 11. FIG. 8 shows the result of the simulation when the strain element 10 in FIG. 7 is seen from a direction diagonal to the Y axis in the Y-Z plane. In FIGS. 7 to 16, reference number 200 indicates "stress concentration area".

As shown in FIGS. 7 and 8, each stress concentration area, where the maximum stress occurs when an external force is applied to the core portion 11 in the X direction, is located on an inwardly facing face of a portion of a flexure 14 where the flexure 14 connects to an arm portion 13.

Note that, as illustrated in FIG. 1, the strain element 10 has a four-fold symmetrical shape in plan view. Therefore, each stress concentration area that appears when a Y-direction external force is applied to the strain element 10 is also located on an inwardly facing face of a portion of a flexure 14 where the flexure 14 connects to an arm portion 13.

Figure 9:
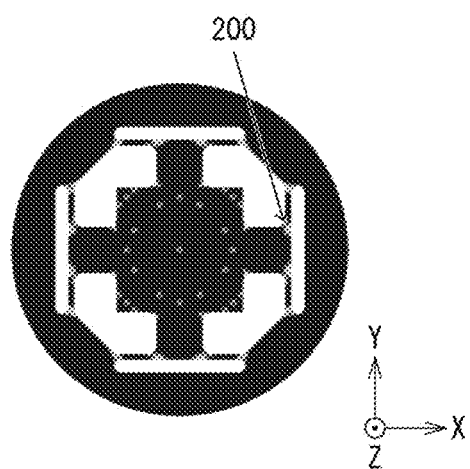
FIG. 9 is a plan view showing the result of a simulation of a stress distribution in the strain element resulting when a Z-direction external force is applied to the core portion in accordance with Embodiment 1.
Figure 10:
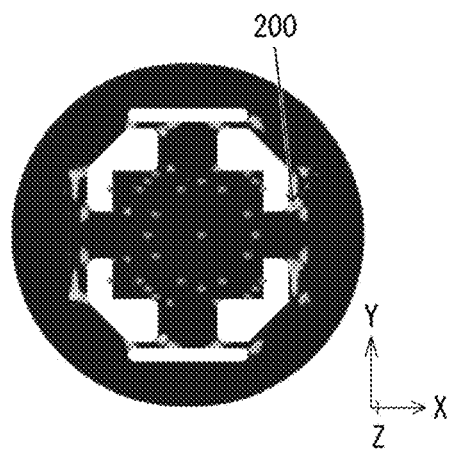
FIG. 10 shows the result of the simulation when the strain element in FIG. 9 is seen from a direction diagonal to the X axis in the X-Z plane.

FIG. 9 is a plan view showing the result of a simulation of a stress distribution in the strain element 10 resulting when a Z-direction external force is applied to the core portion 11. FIG. 10 shows the result of the simulation when the strain element 10 in FIG. 9 is seen from a direction diagonal to the X axis in the X-Z plane.

As shown in FIGS. 9 and 10, each stress concentration area, where the maximum stress occurs when an external force is applied to the core portion 11 in the Z direction, is located on an inwardly facing face of a portion of a flexure 14 where the flexure 14 connects to an arm portion 13.

Figure 11:
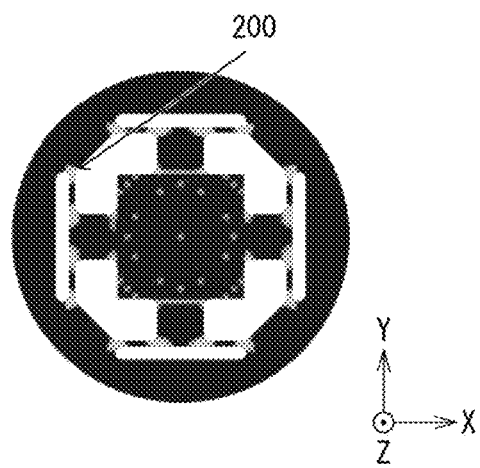
FIG. 11 is a plan view showing the result of another simulation of a stress distribution in the strain element resulting when a Z-direction external force is applied to the core portion in accordance with Embodiment 1.
Figure 12:
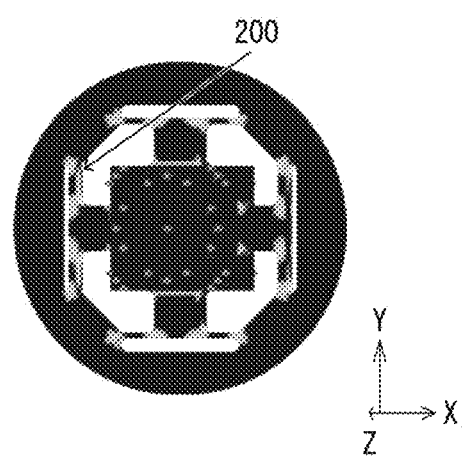
FIG. 12 shows the result of the simulation when the strain element in FIG. 11 is seen from a direction diagonal to the X axis in the X-Z plane.

FIG. 11 is a plan view showing the result of another simulation of a stress distribution in the strain element 10 resulting when a Z-direction external force is applied to the core portion 11. FIG. 12 shows the result of the simulation when the strain element 10 in FIG. 11 is seen from a direction diagonal to the X axis in the X-Z plane.

According to the simulation results shown in FIGS. 11 and 12, each stress concentration area where the maximum stress occurs is located on a first face of a portion of a flexure 14 where the flexure 14 connects to the frame portion 12.

Figure 13:
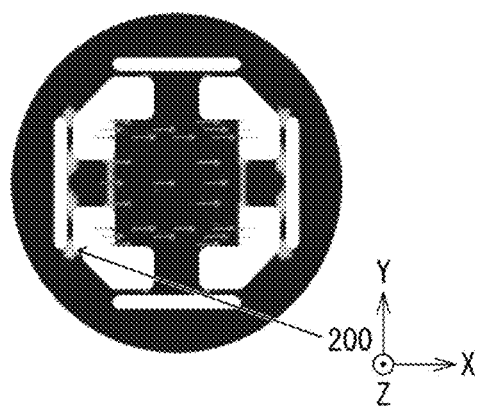
FIG. 13 is a plan view showing the result of a simulation of a stress distribution in the strain element resulting when an external force in a direction of rotation about the Y axis is applied to the core portion in accordance with Embodiment 1.
Figure 14:
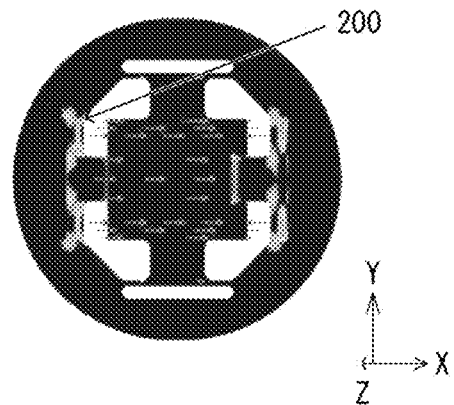
FIG. 14 shows the result of the simulation when the strain element in FIG. 13 is seen from a direction diagonal to the X axis in the X-Z plane.

FIG. 13 is a plan view showing the result of a simulation of a stress distribution in the strain element 10 resulting when an external force in a direction of rotation about the Y axis is applied to the core portion 11. FIG. 14 shows the result of the simulation when the strain element in FIG. 13 is seen from a direction diagonal to the X axis in the X-Z plane.

As shown in FIGS. 13 and 14, each stress concentration area, where the maximum stress occurs when an external force in the direction of rotation about the Y axis is applied to the core portion 11, is located on a first face of a portion of a flexure 14 where the flexure 14 connects to the frame portion 12.

Note that, as described earlier, the strain element 10 has a four-fold symmetrical shape in plan view. Therefore, each stress concentration area that appears when an external force in a direction of rotation about the X axis is applied to the core portion 11 is also located on a first face of a portion of a flexure 14 where the flexure 14 connects to the frame portion 12.

Figure 15:
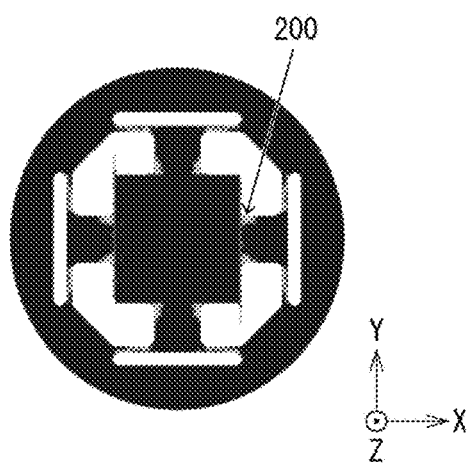
FIG. 15 is a plan view showing the result of a simulation of a stress distribution in the strain element resulting when an external force in a direction of rotation about the Z axis is applied to the core portion in accordance with Embodiment 1.
Figure 16:
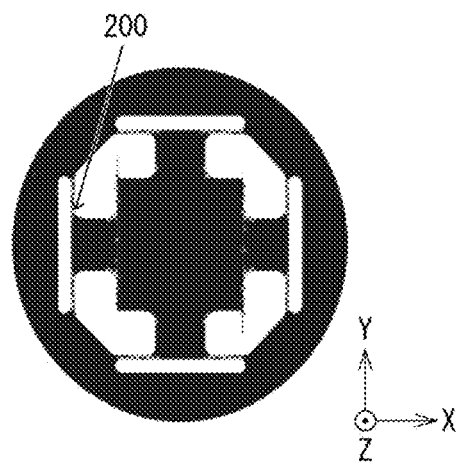
FIG. 16 is a plan view showing the result of another simulation of a stress distribution in the strain element resulting when an external force in the direction of rotation about the Z axis is applied to the core portion in accordance with Embodiment 1.

FIG. 15 is a plan view showing the result of a simulation of a stress distribution in the strain element 10 resulting when an external force in a direction of rotation about the Z axis is applied to the core portion 11. FIG. 16 is a plan view showing the result of another simulation of a stress distribution in the strain element 10 resulting when an external force in the direction of rotation about the Z axis is applied to the core portion 11.

According to the simulation result shown in FIG. 15, each stress concentration area, where the maximum stress occurs when an external force in a direction of rotation about the Z axis is applied to the core portion 11, is located on a first face of a portion of an arm portion 13 where the arm portion 13 connects to the core portion 11. On the contrary, according to the simulation result shown in FIG. 16, each stress concentration area, where the maximum stress occurs when an external force in the direction of rotation about the Z axis is applied to the core portion 11, is located on an inwardly facing face of a portion of a flexure 14 where the flexure 14 connects to an arm portion 13.

As is apparent from the so-far described results of simulation, in the strain element 10, the stress concentration areas, in each of which the maximum stress occurs when an external force in one of the six-axis directions is applied to the core portion 11, can be present in a concentrated manner at (i) the inwardly facing faces of the portions of the flexures 14 where the flexures 14 connect to the arm portions 13 and (ii) the first faces of the portions of the flexures 14 where the flexures 14 connect to the frame portion 12. The inspection strain gauges 16A are disposed at the former positions, and the inspection strain gauges 16B are disposed at the latter positions. That is, each of the inspection strain gauges 16A and the inspection strain gauges 16B is disposed in an area constituted by (i) an area where the stress that occurs in the strain element 10 when an external force parallel to any of the six-axis directions is applied to the core portion 11 is maximum and (ii) the vicinity of that area.

[Configuration of Inspection Bridge Circuit]

As described earlier, the force-torque sensor 100 includes the inspection bridge circuits 20. Each of the inspection bridge circuits 20 is an example of a circuit for inspection (hereinafter also referred to as "inspection circuit"). There is no limitation on the inspection circuit, provided that the inspection circuit is configured to detect a desired direction component of a stress that occurs in the strain element 10.

The configuration of the inspection circuit can be determined appropriately according to the type of inspection element to be used and the direction and type of stress to be detected.

Each inspection bridge circuit 20 includes inspection strain gauges 16A or inspection strain gauges 16B. The inspection bridge circuit 20 has a configuration in which, for example, a series circuit composed of the inspection strain gauges 16A (or inspection strain gauges 16B) and a series circuit composed of fixed resistors 22 are connected in parallel with each other.

The inspection strain gauges 16A (or inspection strain gauges 16B) are such that, when an arm portion 13 or a flexure 14 undergoes a strain, each of the inspection strain gauges 16A (or inspection strain gauges 16B) detects that strain. The inspection bridge circuit 20 is configured to detect bending strains in stress concentration areas of the strain element 10 where the inspection strain gauges 16A (or inspection strain gauges 16B) are disposed.

[Failure Detection Circuit]

The inspection bridge circuit 20 is also connected to a failure detection circuit 30. The failure detection circuit 30 is a circuit that determines whether or not there is plastic deformation of the strain element 10 by comparing a stress detected by the inspection bridge circuit 20 and a predetermined threshold. The failure detection circuit is, for example, a differential amplifier circuit that includes resistors 31 to 34, an amplifier 35, an A-D converter 36, and the CPU 37 (see FIG. 3). The resistor 31 and the resistor 33 are substantially equal in resistance to each other, and the resistor 32 and the resistor 34 are also substantially equal in resistance to each other. The difference between V1 and V2 inputted from the inspection bridge circuit 20 into the amplifier 35 is amplified according to the ratio of the resistance of the resistor 32 to the resistance of the resistor 31, and is then outputted from the amplifier 35. The output signal from the amplifier 35 is converted from an analog signal into a digital signal by the A-D converter 36, and the digital signal is subjected to arithmetic operations at the CPU 37.

[Method of Failure Detection]

The failure detection circuit 30 detects a failure by comparing its output value with a threshold. The threshold is an output value obtained when the force-torque sensor 100 is in a certain state. The threshold may be a default value set on the force-torque sensor 100 (e.g., factory setting of the force-torque sensor 100), and/or may be updated during use of the force-torque sensor 100.

The threshold is, for example, a value corresponding to a stress that causes plastic deformation to occur in one or more of stress concentration areas when an external force in any of the six-axis directions is applied to the core portion 11. More specifically, the threshold can be an output value of the failure detection circuit (i.e., output value of the A-D converter 36) outputted when the safety factor of the stress concentration areas, where the inspection strain gauges 16A (or the inspection strain gauges 16B) are disposed, reaches a predetermined value. As used herein, the term "safety factor" refers to the ratio of "minimum load sufficient to cause plastic deformation of the strain element 10 of the force-torque sensor 100" to "rated load capability of the force-torque sensor 100". The safety factor is determined by the material for the strain element, manufacturing error in stress concentration areas, rated load capability of the force-torque sensor, and/or the like conditions.

The safety factor of the strain element 10 is preferably higher in order to increase the durability of the force-torque sensor 100. The safety factor tends to be lowered in order to increase the sensitivity of the force-torque sensor 100. In consideration of above, the safety factor of the strain element 10 is preferably not less than 2.

For example, assume that the output of the inspection bridge circuit, outputted when the areas where the inspection strain gauges 16A (or the inspection strain gauges 16B) are disposed have a safety factor of 1, is 3 mV/V. If the output value of the A-D converter 36 is greater than 3 mV/V, the CPU 37 determines that there is plastic deformation of the strain element 10. In this manner, the CPU 37 determines that something abnormal is occurring when there is a stress that can actually cause plastic deformation of the strain element 10. This makes it possible to quickly determine whether there is plastic deformation of the strain element.

Alternatively, the threshold is a value corresponding to a stress that occurs in a specific direction in one or more of stress concentration areas when a certain external force is applied to the strain element 10 in its normal state. More specifically, an actual output value of the A-D converter 36 in a specific condition, when the force-torque sensor 100 is in its normal state, is pre-recorded. The "specific condition" herein may be, for example, a condition in which the force-torque sensor 100 is at an angle of 90° to the horizontal direction (tilted vertically) or may be a condition in which a jig having a specific weight is attached to the force-torque sensor 100. The "normal state" herein means a state in which the force-torque sensor 100 or the strain element 10 functions as desired. Whether the force-torque sensor 100 is in its normal state or not can be determined based on, for example, values detected by the force-torque sensor 100 when an external force having a specific direction and a specific magnitude is exerted on the strain element 10.

The above threshold is set based on the above output value of the force-torque sensor 100 in its normal state. For example, the threshold is ±5% of the output value of the force-torque sensor 100 in its normal state under a specific condition. When an actual output value of the A-D converter 36 is greater than the threshold, the CPU 37 determines that there is plastic deformation of the strain element 10. Such a determination of whether there is an abnormality is based on a detected value within the range of normal measurement of the force-torque sensor 100. Therefore, it is possible to determine, with higher certainty, whether there is plastic deformation of the strain element 10 which would affect the measurement of forces by the force-torque sensor 100.

Points in time at which the failure detection circuit 30 determines whether there is plastic deformation of the strain element 10 can be selected appropriately, provided that the effects of Embodiment 1 are achieved. For example, the determination of whether there is plastic deformation may be carried out constantly or regularly (intermittently) after the power of the force-torque sensor 100 is turned on. Alternatively, the determination of whether there is plastic deformation may be automatically carried out when a specific condition is satisfied (e.g., when a predetermined operating time is reached) or may be carried out by an operator of the force-torque sensor 100 anytime desired.

[Flow of Specific Failure Detection Process]

Figure 17:
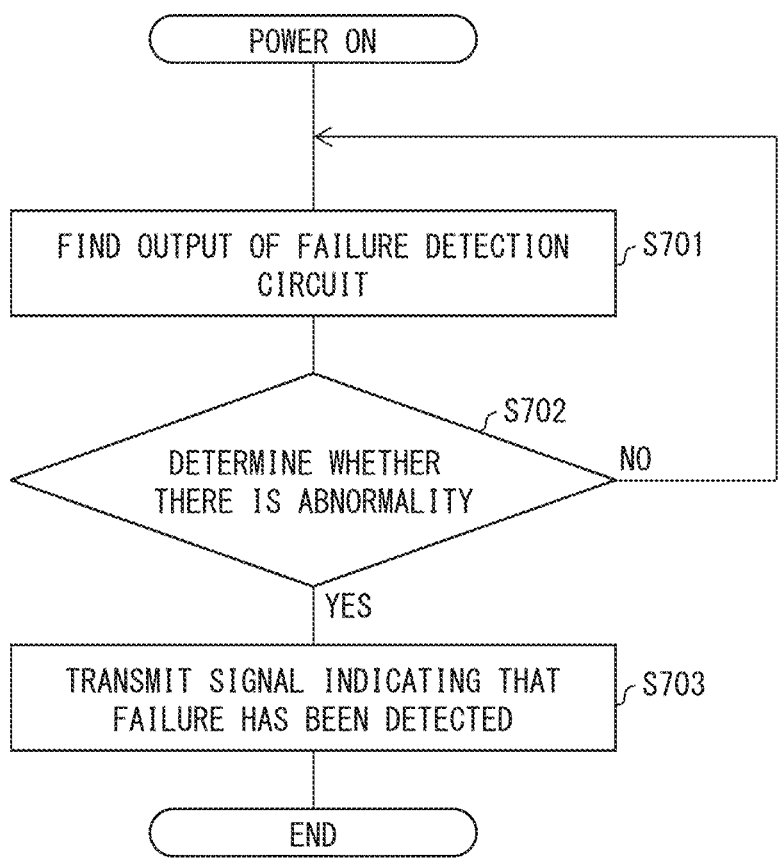
FIG. 17 is a flowchart showing an example of a flow of a process by which a failure detection circuit in accordance with Embodiment 1 of the present invention constantly carries out determination of whether there is a failure.

FIG. 17 is a flowchart showing an example of a flow of a process by which the failure detection circuit 30 constantly carries out determination of whether there is a failure.

In step S701, the failure detection circuit 30 finds its output value. Specifically, the CPU 37 finds an output value of the A-D converter 36.

In step S702, the CPU 37 compares the thus-found output value with a predetermined threshold, and determines whether or not there is an abnormality (i.e., plastic deformation of the strain element 10). Specifically, the CPU 37 determines that there is the abnormality when the output value is greater than the threshold.

If it is determined by the CPU 37 that there is an abnormality, the CPU 37 externally transmits a signal indicating that it has detected an abnormality (step S703). If it is determined in step S702 that there are no abnormalities, the CPU 37 returns the failure detection process to step S701. A user of the force-torque sensor 100 can instantly know the result of the determination of whether there is plastic deformation of the strain element 10.

Figure 18:
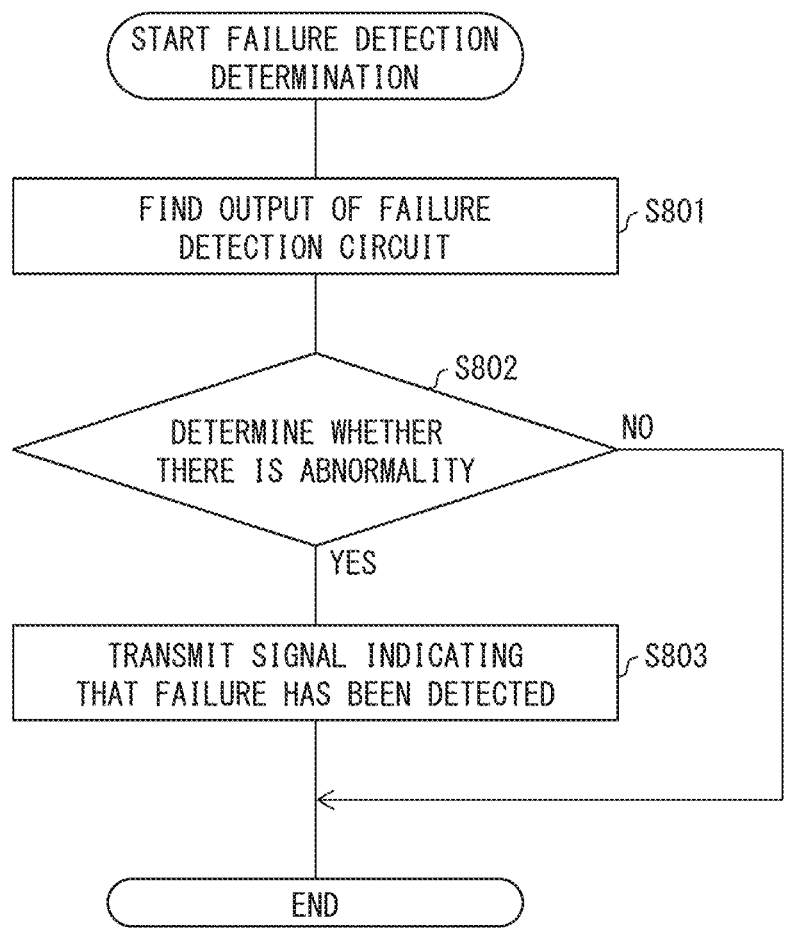
FIG. 18 is a flowchart showing an example of a flow of a process by which the failure detection circuit in accordance with Embodiment 1 of the present invention regularly carries out determination of whether there is a failure.

FIG. 18 is a flowchart showing an example of a flow of a process by which the failure detection circuit 30 regularly carries out determination of whether there is a failure. The CPU 37 starts determining whether there is an abnormality, when a predetermined condition for the start of failure detection is satisfied.

In step S801, the CPU 37 finds an output value of the failure detection circuit 30. Specifically, the CPU 37 acquires the output value of the A-D converter 36.

In step S802, the CPU 37 compares the output value and a threshold, and determines whether or not there is plastic deformation of the strain element 10.

If it is determined in step S802 that there is an abnormality, the CPU 37 externally transmits a signal indicating that it has detected an abnormality (step S803). If it is determined in step S802 that there are no abnormalities, the CPU 37 ends the process of failure detection.

The user of the force-torque sensor 100 can know the result of the determination of whether there is plastic deformation when a predetermined condition is satisfied. This is advantageous to reduce the load of information processing by the force-torque sensor 100 including such a process of failure detection.

Each of the inspection strain gauges 16A and the inspection strain gauges 16B is disposed in any of the stress concentration areas, each of which appears when an external force in one of the six-axis directions is applied to the core portion 11, as is apparent from the foregoing results of simulation. On the other hand, the strain element 10 may undergo plastic deformation due to an overload while forces are measured or while forces are not measured. By determining whether there is plastic deformation of the strain element 10 in the above-described manner, it is possible to more accurately detect plastic deformation of the strain element 10.

Furthermore, as is apparent from the foregoing results of simulation, the locations of the inspection strain gauges 16A and the inspection strain gauges 16B include all the areas where the maximum stresses occur when external forces in the respective six-axis directions are applied to the core portion 11. The inspection bridge circuits 20 are therefore capable of detecting stresses in the areas of the strain element 10 where the maximum stresses occur, with regard to the components, in all the six-axis directions, of the stress detected by the force-torque sensor 100. Thus, by determining whether there is plastic deformation of the strain element 10 in, for example, the above-described manner, it is possible to more accurately detect plastic deformation of the strain element 10 with use of the inspection bridge circuits.

Recap of Embodiment 1

Generally, a force-torque sensor is required to detect a component of a force exerted in a specific direction, such as bending or shearing of a strain element. Therefore, it is usually difficult to dispose measurement strain gauges, which are for measuring stress, at portions of the force-torque sensor where stress most concentrates when an external force is exerted on the strain element, for the purpose of determining the direction of the component of a force to be detected. In view of this, Embodiment 1 can be employed in a force-torque sensor that includes the foregoing measurement strain gauges for detecting forces.

Each stress concentration area tends to appear at a specific position that varies in accordance with the direction of an external force exerted on the core portion. For example, in cases of the components Fx, Fy, and Mz of the external force in the six-axis directions, each stress concentration area tends to spread on an arm portion 13 or a flexure 14 in the form of a strip. On the contrary, in a case of the component Fz, each stress concentration area may be present on a side face of a flexure 14. However, the location of each stress concentration area can be determined appropriately according to the design of the strain element 10, such as dimensions of the arm portions 13 and the flexures 14, such that the stress concentration area resides somewhere between a portion of a flexure 14 where the flexure 14 connects to the frame portion 12 and a portion of an arm portion 13 where the arm portion 13 connects to the core portion 11.

When all measurement strain gauges and inspection strain gauges can be disposed only on a specific single face (e.g., first face) of the strain element 10, all the measurement and inspection strain gauges and all the bridge circuits can be disposed only on that specific face, in some cases. In such cases, all the measurement and inspection strain gauges and all the bridge circuits can be prepared at a time on the specific face of the strain element 10 by a known patterning technique such as sputtering. This is advantageous in terms of productivity.

The force-torque sensor 100 in accordance with Embodiment 1 includes: the inspection strain gauges 16A and the inspection strain gauges 16B disposed in stress concentration areas of the strain element 10; and the inspection bridge circuits 20 each including the inspection strain gauges 16A or the inspection strain gauges 16B. The force-torque sensor 100 in accordance with Embodiment 1 is therefore more advantageous than force-torque sensors which do not include the above-described constituent elements in that the force-torque sensor 100 is capable of detecting plastic deformation of the strain element 10.

Embodiment 2

The following description will discuss another embodiment of the present invention. For convenience of description, members having functions identical to those described in Embodiment 1 are assigned identical referential numerals, and their descriptions are omitted here.

Figure 19:
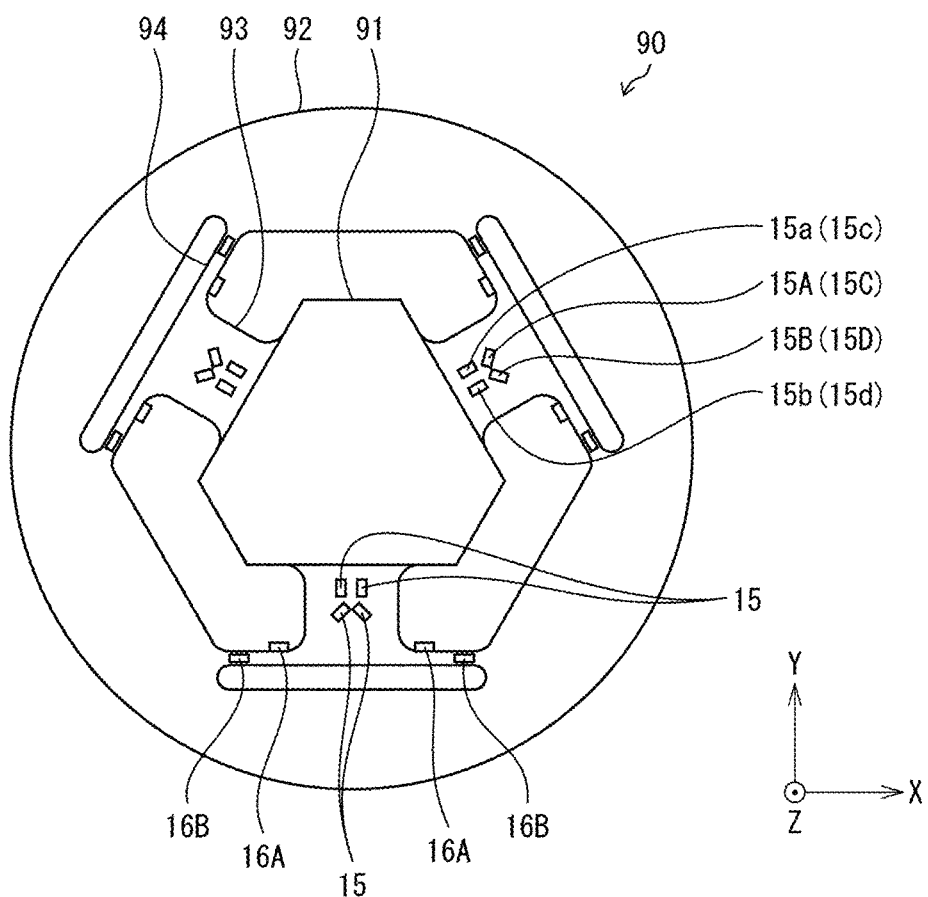
FIG. 19 is a plan view schematically illustrating a structure of a strain element included in a force-torque sensor in accordance with Embodiment 2 of the present invention.

Embodiment 1 discusses an arrangement in which four beam portions are arranged in the form of a cross (in the form of a letter X) when seen in plan view. In Embodiment 2, an arrangement in which three beam portions are arranged in the form of a letter Y when seen in plan view is discussed with reference to FIG. 19. FIG. 19 is a plan view schematically illustrating a structure of a strain element included in a force-torque sensor in accordance with Embodiment 2 of the present invention. The force-torque sensor in accordance with Embodiment 2 is equal in configuration to the force-torque sensor in accordance with Embodiment 1, except that the shape of the strain element is different and accordingly the arrangement of measurement strain gauges is different.

The following description mainly discusses differences between Embodiment 2 and Embodiment 1.

The force-torque sensor in accordance with Embodiment 2 includes a strain element 90. The strain element 90 is configured such that, when a core portion 91 and a frame portion 92 are considered rigid bodies, the beam portions can be considered elastic bodies. The strain element 90 has the core portion 91 located at the center when seen in plan view.

In Embodiment 2, the core portion 91 is in the shape of a prism with a substantially hexagonal base (i.e., substantially in the shape of a hexagonal prism). The frame portion 92 in Embodiment 2 is in the shape of a tube with a substantially circular base having a substantially hexagonal opening.

The strain element 90 includes the beam portions. The number of beam portions in Embodiment 2 is three. The beam portions are arranged so as to from a letter Y shape when seen in plan view. The beam portions are arranged along a circumferential direction of the core portion 91 and the frame portion 92 so as to be equally spaced apart from each other (spaced apart from each other by 120° around the center of the core portion 91). The beam portions each extend radially from the core portion 91. The axes of the beam portions intersect each other at the center of the core portion 91 at an angle of 120°. The beam portions are each constituted by an arm portion 93 and a flexure 94, similarly to those of Embodiment 1. The number of beam portions may be any number, provided that the number is not less than three.

Each arm portion 93 has a first face and a second face, on which measurement strain gauges 15 and measurement bridge circuits (not illustrated) are disposed. The measurement strain gauges 15 on one of the first and second faces are positioned opposite the respective measurement strain gauges 15 on the other of the first and second faces with the arm portion 93 between them, in plan view. The number of measurement strain gauges 15 disposed on each of the first and second faces of the arm portion 93 is four. Two of the four measurement strain gauges 15 are positioned closer to the core portion 91 than the other two are, and the other two are closer to the frame portion 92 than the former two are. The former two are positioned next to each other with the axis of the arm portion 93 therebetween (for example, 15a and 15b on the first face in FIG. 19). The latter two are arranged symmetrically with each other with respect to the axis of the arm portion 93, and are each oriented at an angle of 45° or 135° to the axis of the arm portion 93 (for example, 15A and 15B on the first face in FIG. 19).

On the second face of the arm portion 93, there are measurement strain gauges 15c and 15C which are positioned opposite the respective measurement strain gauges 15a and 15A with the arm portion 93 between them, and there are measurement strain gauges 15d and 15D which are positioned opposite the respective measurement strain gauges 15b and 15B with the arm portion 93 between them.

In Embodiment 2, a measurement bridge circuit (not illustrated) has a configuration in which, for example, a first series circuit composed of the measurement strain gauges 15a and 15d connected in series in this order and a second series circuit composed of the measurement strain gauges 15c and 15b connected in series in this order are connected in parallel with each other. Another measurement bridge circuit (not illustrated) has a configuration in which, for example, a first series circuit composed of the measurement strain gauges 15A and 15D connected in series in this order and a second series circuit composed of the measurement strain gauges 15B and 15C connected in series in this order are connected in parallel with each other.

In Embodiment 2, the inspection strain gauges and inspection bridge circuits are arranged similarly to Embodiment 1. The following description discusses stress concentration areas in Embodiment 2.

[Examples of Simulation Results]

Figure 20:
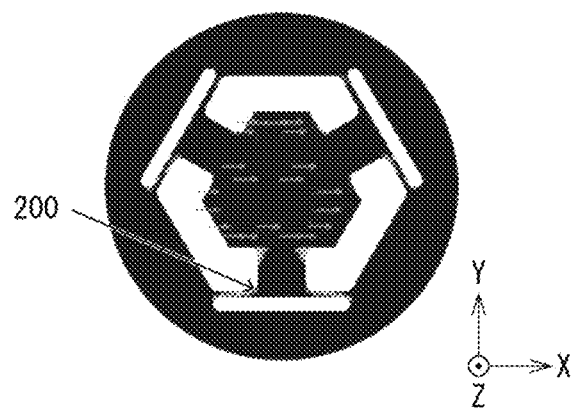
FIG. 20 is a plan view showing the result of a simulation of a stress distribution in a strain element resulting when an X-direction external force is applied to a core portion in accordance with Embodiment 2.
Figure 21:
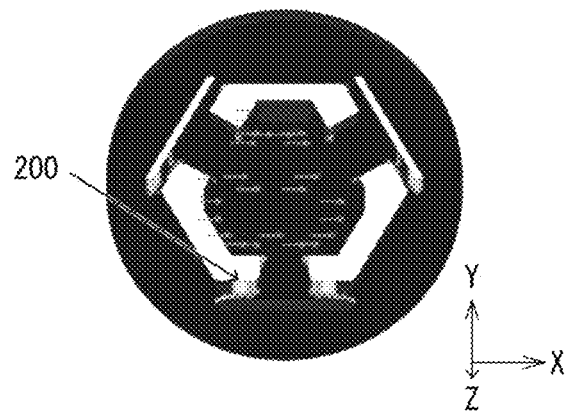
FIG. 21 shows the result of the simulation when the strain element in FIG. 20 is seen from a direction diagonal to the Y axis in the Y-Z plane.

FIG. 20 is a plan view showing the result of a simulation of a stress distribution in the strain element 90 resulting when an X-direction external force is applied to the core portion 91. FIG. 21 shows the result of the simulation when the strain element 90 in FIG. 20 is seen from a direction diagonal to the Y axis in the Y-Z plane. In FIGS. 20 to 29, reference number 200 indicates "stress concentration area".

As shown in FIGS. 20 and 21, each stress concentration area, where the maximum stress occurs when an external force is applied to the core portion 91 in the X direction, is located on an inwardly facing face of a portion of a flexure 94 where the flexure 94 connects to an arm portion 93.

Note that each stress concentration area, where the maximum stress occurs when an external force is applied to the core portion 91 in the Y direction, is located on an inwardly facing face of a portion of a flexure 94 where the flexure 94 connects to an arm portion 93 (this is not shown in the drawings).

Figure 22:
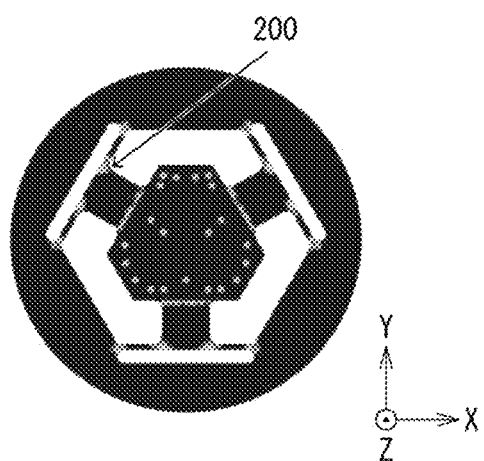
FIG. 22 is a plan view showing the result of a simulation of a stress distribution in the strain element resulting when a Z-direction external force is applied to the core portion in accordance with Embodiment 2.
Figure 23:
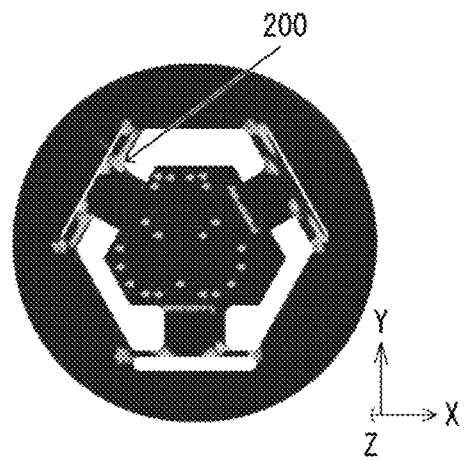
FIG. 23 shows the result of the simulation when the strain element in FIG. 22 is seen from a direction diagonal to the X axis in the X-Z plane.

FIG. 22 is a plan view showing the result of a simulation of a stress distribution in the strain element 90 resulting when a Z-direction external force is applied to the core portion 91. FIG. 23 shows the result of the simulation when the strain element 90 in FIG. 22 is seen from a direction diagonal to the X axis in the X-Z plane.

As shown in FIGS. 22 and 23, each stress concentration area, where the maximum stress occurs when an external force is applied to the core portion 91 in the Z direction, is located on an inwardly facing face of a portion of a flexure 94 where the flexure 94 connects to an arm portion 93.

Figure 24:
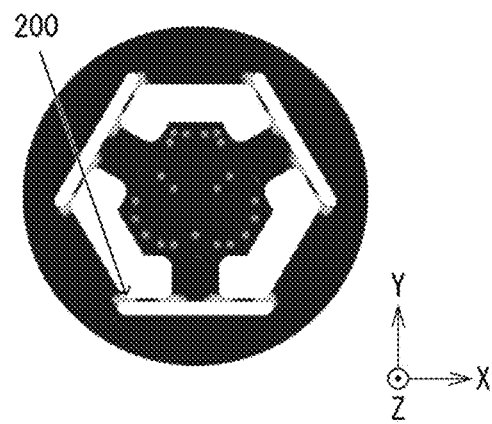
FIG. 24 is a plan view showing the result of another simulation of a stress distribution in the strain element resulting when a Z-direction external force is applied to the core portion in accordance with Embodiment 2.
Figure 25:
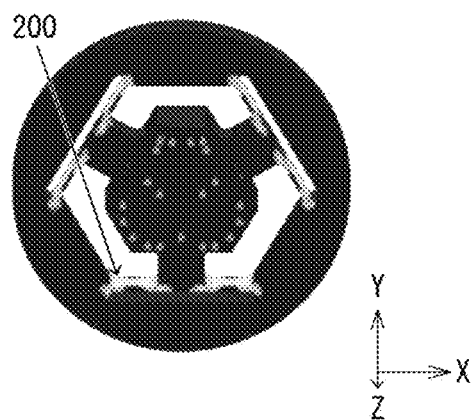
FIG. 25 shows the result of the simulation when the strain element in FIG. 24 is seen from a direction diagonal to the X axis in the X-Z plane.

FIG. 24 is a plan view showing the result of another simulation of a stress distribution in the strain element 90 resulting when a Z-direction external force is applied to the core portion 91. FIG. 25 shows the result of the simulation when the strain element 90 in FIG. 24 is seen from a direction diagonal to the Y axis in the Y-Z plane.

According to the simulation results shown in FIGS. 24 and 25, each stress concentration area, where the maximum stress occurs, is located on a first face of a portion of a flexure 94 where the flexure 94 connects to the frame portion 92.

Figure 26:
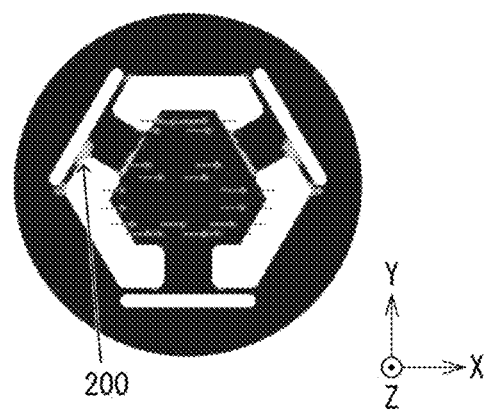
FIG. 26 is a plan view showing the result of a simulation of a stress distribution in the strain element resulting when an external force in a direction of rotation about the Y axis is applied to the core portion in accordance with Embodiment 2.
Figure 27:
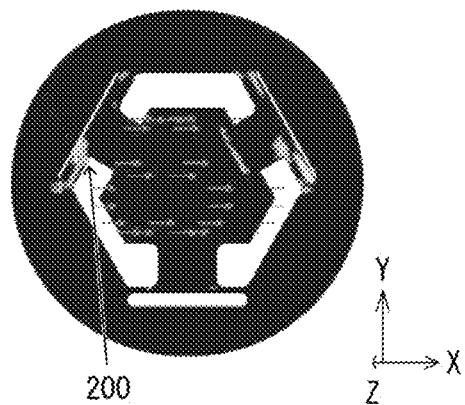
FIG. 27 shows the result of the simulation when the strain element in FIG. 26 is seen from a direction diagonal to the X axis in the X-Z plane.

FIG. 26 is a plan view showing the result of a simulation of a stress distribution in the strain element 90 resulting when an external force in a direction of rotation about the Y axis is applied to the core portion 91. FIG. 27 shows the result of the simulation when the strain element 90 in FIG. 26 is seen from a direction diagonal to the X axis in the X-Z plane.

As shown in FIGS. 26 and 27, each stress concentration area, where the maximum stress occurs when an external force in the direction of rotation about the Y axis is applied to the core portion 91, is located at a border between (i) an inwardly facing face of a portion of a flexure 94 where the flexure 94 connects to an arm portion 93 and (ii) a first face of that portion.

Figure 28:
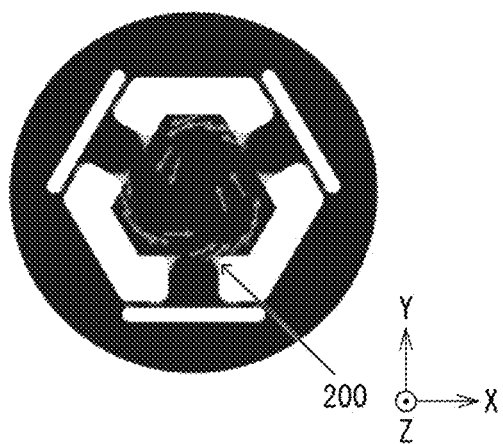
FIG. 28 is a plan view showing the result of a simulation of a stress distribution in the strain element resulting when an external force in a direction of rotation about the Z axis is applied to the core portion in accordance with Embodiment 2.
Figure 29:
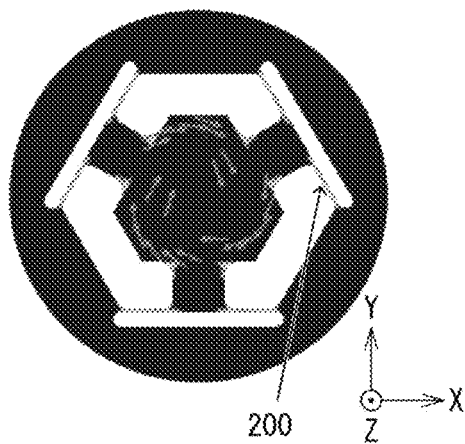
FIG. 29 is a plan view showing the result of another simulation of a stress distribution in the strain element resulting when an external force in a direction of rotation about the Z axis is applied to the core portion in accordance with Embodiment 2.

FIG. 28 is a plan view showing the result of a simulation of a stress distribution in the strain element 90 resulting when an external force in a direction of rotation about the Z axis is applied to the core portion 91. FIG. 29 is a plan view showing the result of another simulation of a stress distribution in the strain element 90 resulting when an external force in a direction of rotation about the Z axis is applied to the core portion 91.

According to the simulation result shown in FIG. 28, each stress concentration area, where the maximum stress occurs when the external force in the direction of rotation about the Z axis is applied to the core portion 91, is located on a first face of a portion of an arm portion 93 where the arm portion 93 connects the core portion 91. On the contrary, according to the simulation result shown in FIG. 29, each stress concentration area, where the maximum stress occurs when the external force in the direction of rotation about the Z axis is applied to the core portion 91, is located on a first face of a portion of a flexure 94 where the flexure 94 connects to an arm portion 93.

As is apparent from the so-far described results of simulation, the stress concentration areas, in each of which the maximum stress occurs when an external force in one of the six-axis directions is applied to the core portion 91, can be present in a concentrated manner at (i) the portions of the flexures 94 where the flexures 94 connect to the arm portions 93 and (ii) the portions of the flexures 94 where the flexures 94 connect to the frame portion 92. In the strain element 90, the inspection strain gauges 16A are disposed at the former positions, and the inspection strain gauges 16B are disposed at the latter positions. That is, also in Embodiment 2, each of the inspection strain gauges 16A and the inspection strain gauges 16B is disposed in an area constituted by (i) an area where the stress that occurs in the strain element 90 when an external force in any of the six-axis directions is applied to the core portion 91 is maximum and (ii) the vicinity of that area.

[Effects]

According to Embodiment 2, it is possible to carry out measurement of stress and to determine whether or not there is plastic deformation of a strain element, similarly to the foregoing Embodiment 1. A force-torque sensor in accordance with Embodiment 2 provides the same effects as those of Embodiment 1. Embodiment 2 is further configured such that the measurement strain gauges 15 are disposed only on the first and second faces of the strain element 90 (i.e., not disposed on side faces); therefore, four measurement strain gauges 15 configured integrally with each other can be attached to the front face of the strain element 90. The force-torque sensor in accordance with Embodiment 2 thus makes it possible to reduce the number of process steps as compared to that of Embodiment 1.

[Variations]

Embodiments 1 and 2 discuss cases in which a force sensor in accordance with the present invention is a six-axis force-torque sensor. The force sensor in accordance with the present invention is not limited to the six-axis force-torque sensor, and can be, for example, a force sensor for detecting (measuring) a component of a force having at least one of the magnitude and the direction of a force received by an object. Such a force sensor, if it detects inertial forces, is also called a motion sensor such as an acceleration sensor or an angular velocity sensor.

The strain element only needs to have a structure that is sufficient to achieve a desired purpose of the force-torque sensor. For example, arms or flexures are not essential in the strain element.

There is no limitation on the outer shape of the strain element, as well. The outer shape of the strain element may be a shape other than a circle, for example, may be a quadrangle or a polygon.

Embodiments 1 and 2 discuss arrangements in which the central portion of a strain element is used as a core portion whereas a rim portion that extends around the core portion is used as a frame portion. Note, however, that the structure of the strain element is not limited as such. For example, the central portion of a strain element may be used as a frame portion, whereas a rim portion that extends around the frame portion may be used as a core portion.

In a case of a six-axis force-torque sensor for detecting the components of a force in six-axis directions (including moment components) individually, the strain element only needs to include three or more beam portions. The force-torque sensor, including such a strain element, only needs to be capable of detecting at least one set of bending strain and shearing strain in each beam portion. For example, a measurement strain gauge only needs to be capable of detecting bending strain and shearing strain in a beam portion, and the measurement strain gauge only needs to be disposed on least one of an arm portion and a flexure which constitute the beam portion.

According to Embodiments 1 and 2, inspection bridge circuits detect stresses that occur in stress concentration areas and that correspond to a respective plurality of directions of a force detected by a force-torque sensor. Note, however, that the inspection bridge circuits may only detect a stress(es) corresponding to at least one but not all of the plurality of directions. The number of inspection bridge circuits can be determined appropriately according to the conditions under which the force-torque sensor is used.

For example, an inspection bridge circuit(s) may be configured to detect only a stress in a direction of the largest component of an external force exerted on the force-torque sensor. Alternatively, an inspection bridge circuit(s) may be configured to detect only a stress in a direction in which an external force is most frequently exerted. In cases where the force-torque sensor receives an external force in substantially only a specific single limited direction as described above, the inspection bridge circuit may be a circuit that detects a component of a stress parallel to that specific direction to determine whether there is plastic deformation. An arrangement in which the inspection bridge circuit(s) detect(s) only a component(s) of a stress in at least one but not all of the plurality of directions is advantageous in terms of a reduction in information processing load on the force-torque sensor and a reduction in the number of man hours for production.

The location of an inspection bridge circuit is usually, but not limited to, the vicinity of an inspection strain gauge. For example, a fixed resistor of the inspection bridge circuit may be disposed on a side face of an arm portion or on a side face of a flexure, but the fixed resistor may be disposed somewhere other than the strain element. In another example, the fixed resistor may be included in a circuit board provided separately from the strain element, and the inspection bridge circuit may be provided separately from the strain element in this manner.

Measurement strain gauges and measurement bridge circuits may be configured integrally with each other, and inspection strain gauges and inspection bridge circuits may be configured integrally with each other, in order to improve operation efficiency. When such integrally configured strain gauges and bridge circuits are attached to an arm portion or a flexure of a strain element, the measurement or inspection strain gauges and bridge circuits can be placed more easily. Such an arrangement is advantageous also in order to reduce connection failure of strain gauges of a bridge circuit.

The inspection strain gauges and inspection bridge circuits may be configured to detect compression or tension instead of bending. Alternatively, the inspection strain gauges and inspection bridge circuits may be configured to detect two or more of bending, compression, and tension. The strain to be detected may be any type of strain, and is determined appropriately by the arrangement of strain gauges or the manner in which strain gauges in a bridge circuit are connected.

There is no limitation on the arrangement of measurement and inspection strain gauges in a strain element, provided that the effects of any of the embodiments are achieved. The strain gauges may be disposed only on one face of a strain element or may be disposed on any of the faces of a beam portion, according to need.

[Software Implementation Example]

According to an embodiment of the present invention, a stress detected by an inspection bridge circuit is compared with a predetermined threshold, and thereby whether or not there is plastic deformation of a strain element is determined. Control blocks for determining whether or not there is the plastic deformation can be realized by a logic circuit (hardware) provided in an integrated circuit (IC chip) or the like or can be alternatively realized by software.

In the latter case, the feature for determining whether or not there is the plastic deformation includes a computer that executes instructions of a program that is software realizing the foregoing functions. The computer, for example, includes at least one processor and a computer-readable storage medium storing the program. An object of the present invention can be achieved by the processor of the computer reading and executing the program stored in the storage medium. Examples of the processor encompass the foregoing CPU.

Examples of the storage medium encompass a "non-transitory tangible medium" such as a read only memory (ROM), a tape, a disk, a card, a semiconductor memory, and a programmable logic circuit. The computer may further include a random access memory (RAM) or the like in which the program is loaded. Further, the program may be supplied to or made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

Aspects of the present invention can also be expressed as follows.

A force sensor in accordance with Aspect 1 of the present invention is a force sensor for detecting components, in a plurality of directions, of a force exerted on a strain element, the force sensor including an inspection circuit that includes inspection strain sensing elements disposed in stress concentration areas of the strain element and that is configured to detect a component, in a specific direction, of a stress that occurs in the strain element.

According to the above arrangement, it is possible to detect stresses in the stress concentration areas where plastic deformation of the strain element is more likely to occur. This makes it possible to detect plastic deformation of the strain element.

In Aspect 2 of the present invention, a force sensor may be arranged such that, in Aspect 1, the stress concentration areas, where the inspection strain sensing elements are disposed, are each constituted by (i) an area where a stress that occurs in the strain element when an external force in any of the plurality of directions is applied to the strain element is maximum and (ii) a vicinity of the area.

The above arrangement is more effective in that the above force sensor detects, with higher certainty, plastic deformation of the strain element that would result from the measurement of forces by the force sensor.

In Aspect 3 of the present invention, a force sensor may be arranged such that, in Aspect 1 or 2, the force sensor further includes a circuit or a processor configured to determine whether or not there is plastic deformation of the strain element by comparing (i) a threshold corresponding to a stress that causes plastic deformation to occur in any one or more of the stress concentration areas when an external force in the specific direction is applied to the strain element and (ii) the component of the stress detected by the inspection circuit.

According to the above arrangement, the strain element is determined to have plastically deformed when there is a stress that can cause plastic deformation of the strain element. This is more effective in order to quickly determine whether there is plastic deformation of the strain element.

In Aspect 4 of the present invention, a force sensor may be arranged such that, in Aspect 1 or 2, the force sensor further includes a circuit or a processor configured to determine whether or not there is plastic deformation of the strain element by comparing the component of the stress detected by the inspection circuit and a predetermined threshold, the predetermined threshold corresponding to a stress that occurs in the specific direction in any one or more of the stress concentration areas when a predetermined force is applied to the strain element in its normal state.

According to the above arrangement, an abnormal value is detected due to plastic deformation of the strain element. This is more effective in order to determine whether there is plastic deformation of the strain element with higher certainty.

In Aspect 5 of the present invention, a force sensor may be arranged such that, in any of Aspects 1 to 4, the plurality of directions are the following six directions: directions parallel to respective three orthogonal axes; and directions of rotation about the respective three orthogonal axes.

According to the above arrangement, the force sensor makes it possible to measure the force in six-axis directions useful for the force sensor.

In Aspect 6 of the present invention, a force sensor may be arranged such that, in any of Aspects 1 to 5, the strain element includes: a core portion configured to receive a force; a frame portion fixed to the core portion; an arm portion that connects the core portion and the frame portion; and a flexure that resides between the frame portion and the arm portion.

The above arrangement is more effective than force sensors with no flexures in that forces exerted on the strain element are detected more accurately.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 10, 90, strain element
11, 91 core portion
12, 92 frame portion
13, 93 arm portion
14, 94 flexure
15 measurement strain gauge
16A, 16B inspection strain gauge
20 inspection bridge circuit
22 fixed resistor
30 failure detection circuit
31, 32, 33, 34 resistor
35 amplifier
36 A-D converter
37 CPU
100 force-torque sensor

The invention claimed is:

1. A force sensor for detecting components, in a plurality of directions, of a force exerted on a strain element, the force sensor comprising:
an inspection circuit that includes inspection strain sensing elements disposed in stress concentration areas of the strain element and that is configured to detect a component, in a specific direction, of a stress that occurs in the strain element; and
a circuit or a processor configured to determine whether or not there is plastic deformation of the strain element by comparing (i) a threshold corresponding to a stress that causes plastic deformation to occur in any one or more of the stress concentration areas when an external force in the specific direction is applied to the strain element and (ii) the component of the stress detected by the inspection circuit.

2. The force sensor according to claim 1, wherein the stress concentration areas, where the inspection strain sensing elements are disposed, are each constituted by (i) an area where a stress that occurs in the strain element when an external force in any of the plurality of directions is applied to the strain element is maximum and (ii) a vicinity of the area.

3. The force sensor according to claim 1, further comprising a circuit or a processor, the circuit or the processor being configured to determine whether or not there is plastic deformation of the strain element by comparing the component of the stress detected by the inspection circuit and a predetermined threshold, the predetermined threshold corresponding to a stress that occurs in the specific direction in any one or more of the stress concentration areas when a predetermined force is applied to the strain element in its normal state.

4. The force sensor according to claim 1, wherein the plurality of directions are the following six directions: directions parallel to respective three orthogonal axes; and directions of rotation about the respective three orthogonal axes.

5. The force sensor according to claim 1, wherein the strain element includes: a core portion configured to receive a force; a frame portion fixed to the core portion; an arm portion that connects the core portion and the frame portion; and a flexure that resides between the frame portion and the arm portion.

* * * * *